United States Patent
Bae et al.

(10) Patent No.: US 10,054,264 B2
(45) Date of Patent: Aug. 21, 2018

(54) REINFORCING MEMBER FIXING DEVICE FOR PRIMARY BARRIER OF LIQUEFIED NATURAL GAS STORAGE TANK

(71) Applicant: SAMSUNG HEAVY IND. CO., LTD., Seoul (KR)

(72) Inventors: Junhong Bae, Geoje-si (KR); Jong Gyu Lee, Gwangju (KR); Hee-Moon Chae, Seoul (KR); Yang Heon Lee, Geoje-si (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 676 days.

(21) Appl. No.: 14/407,915

(22) PCT Filed: Nov. 22, 2012

(86) PCT No.: PCT/KR2012/009925
§ 371 (c)(1),
(2) Date: Dec. 12, 2014

(87) PCT Pub. No.: WO2013/187564
PCT Pub. Date: Dec. 19, 2013

(65) Prior Publication Data
US 2015/0132048 A1    May 14, 2015

(30) Foreign Application Priority Data

Jun. 13, 2012 (KR) .................. 10-2012-0063221

(51) Int. Cl.
*F16B 5/00*    (2006.01)
*F17C 3/02*    (2006.01)
(Continued)

(52) U.S. Cl.
CPC ............... *F17C 3/027* (2013.01); *B63B 3/68* (2013.01); *B63B 25/16* (2013.01); *B65D 90/06* (2013.01);
(Continued)

(58) Field of Classification Search
CPC ............. F17C 3/027; F17C 2270/0107; F17C 2203/011; F17C 2203/0358;
(Continued)

(56) References Cited

U.S. PATENT DOCUMENTS 3,114,470 A * 12/1963 McDill ................. B63B 3/68
220/560.06
3,547,302 A * 12/1970 Massac ............... B63B 25/16
114/74 A
(Continued)

FOREIGN PATENT DOCUMENTS

DE    1271130 B * 6/1968 ............. F17C 3/025
EP    2455650 A2   5/2012
(Continued)

*Primary Examiner* — Jonathan P Masinick
*Assistant Examiner* — Matthew R McMahon
(74) *Attorney, Agent, or Firm* — McDermott Will & Emery LLP

(57) ABSTRACT

A fixing device of a first barrier-reinforcing member for supporting first and second corrugated portions that are formed in a first barrier to cross each other in a liquefied natural gas (LNG) storage tank including a heat-insulating board and a first barrier positioned thereon and forming an inner wall, includes: a fixing bracket including a coupling portion fixedly inserted in insertion grooves formed under lateral sides of a crossing portion where the first and second corrugated portions cross, and a body coupled to one side of the coupling portion; and a first fastening member for fastening an impact-absorbing plate between the heat-insulating board and the first barrier with the other side of the (Continued)

body. The reinforcing member is fixed to inner sides of the first and second corrugated portions by the impact-absorbing plate.

6 Claims, 15 Drawing Sheets

(51) Int. Cl.
*B63B 3/68* (2006.01)
*B63B 25/16* (2006.01)
*B65D 90/06* (2006.01)
*B65D 90/08* (2006.01)

(52) U.S. Cl.
CPC ...... *B65D 90/08* (2013.01); *F17C 2201/0157* (2013.01); *F17C 2201/052* (2013.01); *F17C 2203/011* (2013.01); *F17C 2203/0358* (2013.01); *F17C 2203/0631* (2013.01); *F17C 2209/232* (2013.01); *F17C 2221/033* (2013.01); *F17C 2223/0161* (2013.01); *F17C 2223/033* (2013.01); *F17C 2260/011* (2013.01); *F17C 2270/0107* (2013.01); *Y10T 403/58* (2015.01)

(58) Field of Classification Search
CPC ........ F17C 2209/232; F17C 2223/0161; F17C 2223/033; F17C 2221/033; F17C 2260/011; B63B 25/16; B63B 3/68; B65D 90/06; B65D 90/08; Y10T 403/58
See application file for complete search history.

(56) References Cited

U.S. PATENT DOCUMENTS

| | | | | |
|---|---|---|---|---|
| 4,128,069 A | * | 12/1978 | Kotcharian | F17C 3/04 114/74 A |
| 4,155,482 A | * | 5/1979 | Swaney | B63B 25/16 220/560.11 |
| 4,335,831 A | | 6/1982 | Swaney | |
| 4,794,748 A | * | 1/1989 | Schilf | F16L 59/065 220/592.2 |
| 7,540,395 B2 | * | 6/2009 | Dhellemmes | B63B 3/68 220/608 |
| 7,717,289 B2 | * | 5/2010 | Yang | B63B 25/16 220/560.07 |
| 8,776,707 B2 | * | 7/2014 | Joh | B63B 3/68 114/75 |
| 2011/0186580 A1 | | 8/2011 | Joh et al. | |
| 2015/0114970 A1 | | 4/2015 | Joh et al. | |

FOREIGN PATENT DOCUMENTS

| | | | | |
|---|---|---|---|---|
| FR | 2936784 A1 | * | 4/2010 | ............ F17C 3/027 |
| JP | S55-78896 A | | 6/1980 | |
| JP | 07-165167 A | | 6/1995 | |
| JP | 2011-512287 A | | 4/2011 | |
| JP | 2012-505125 A | | 3/2012 | |
| KR | 10-2010-0013223 A | | 2/2010 | |
| KR | 10-2010-0032106 A | | 3/2010 | |
| KR | 10-2010-0078321 | | 7/2010 | |
| KR | 10-2011-0070998 A | | 6/2011 | |
| KR | 10-2012-0013208 A | | 2/2012 | |
| KR | 10-2012-0013217 A | | 2/2012 | |
| KR | 10-2012-0013229 A | | 2/2012 | |
| KR | 10-2012-0044054 A | | 5/2012 | |
| WO | WO 2012020194 A1 | * | 2/2012 | ............ F17C 3/025 |

* cited by examiner

REINFORCING MEMBER FIXING DEVICE FOR PRIMARY BARRIER OF LIQUEFIED NATURAL GAS STORAGE TANK

TECHNICAL FIELD

The present invention relates to a fixing device of a first barrier-reinforcing member of a liquefied natural gas (LNG) storage tank.

BACKGROUND ART

A liquefied natural gas (LNG) storage tank is used for storing or transporting liquefied natural gas (LNG) at an ultralow temperature of about −162° C., and is provided with two barriers (a first barrier and a second barrier) for sealing the LNG.

In addition, the LNG storage tank forms a heat-insulating layer using a heat-insulating board in which a heat-insulating member-protecting plate having a high compressive strength like plywood is combined with a heat-insulating member that is formed of a polyurethane foam material having low thermal conductivity between the first barrier and the second barrier and between the second barrier and an internal hull.

In this case, the first barrier of the LNG storage tank is required to provide high air-tightness because it directly contacts the LNG.

In the LNG storage tank, since a plurality of barrier sheets formed of a stainless steel material are bonded by welding to form the first barriers, the first barriers may undergo heat-shrinkage when contacting the ultra-low temperature LNG and thus welding portions thereof can be broken by thermal stress when the heat shrinkage occurs.

Because of such a problem, the first barriers have corrugated portions to have low in-plane stiffness.

When the heat-shrinkage occurs, the corrugated portions are deformed to a certain degree, thereby reducing the thermal stress at the welding portions.

Meanwhile, when the LNG storage tank in which the LNG is stored is transported by means of transportation such as a vessel and the like, movement can occur on a surface of the stored LNG by movements such as rolling, pitching, and the like of the vessel during transportation.

Such movement is referred to as sloshing, and the sloshing causes a large compressive force to be applied to the first barriers.

When the compressive force due to the sloshing exceeds yield strengths of the first barriers, the corrugated portions can be permanently deformed because they are the most vulnerable to deformation, thereby deteriorating safety of the first barriers.

Thus, the first barriers should not only maintain the low in-plane stiffness in response to the thermal shrinkage, but also have high pressure resistance performance in response to the compressive force due to the sloshing.

In order to improve the pressure resistance performance of the first barriers, the applicant of the present invention has disclosed, in Korean application No. 10-2008-0091085, a structure in which reinforcing members are installed under the corrugated portions of the first barriers.

However, such reinforcing members are not fixed to the corrugated portions of the first barrier, thereby making it difficult to install the reinforcing members under the corrugated portions of the first barrier.

The above information disclosed in this Background section is only for enhancement of understanding of the background of the invention and therefore it may contain information that does not form the prior art that is already known in this country to a person of ordinary skill in the art.

DISCLOSURE

Technical Problem

An exemplary embodiment of the present invention provides a fixing device for fixing a first barrier-reinforcing member to corrugated portions of a first barrier of an LNG storage tank.

Technical Solution

An exemplary embodiment of the present invention provides a fixing device of a first barrier-reinforcing member for supporting first and second corrugated portions that are formed in a first barrier to cross each other in a liquefied natural gas (LNG) storage tank including a heat-insulating board and a first barrier positioned thereon and forming an inner wall, including: a fixing bracket including a coupling portion fixedly inserted in insertion grooves formed under lateral sides of a crossing portion where the first and second corrugated portions cross, and a body coupled to one side of the coupling portion; and a first fastening member for fastening an impact-absorbing plate between the heat-insulating board and the first barrier with the other side of the body. The reinforcing member is fixed to inner sides of the first and second corrugated portions by the impact-absorbing plate.

The first barrier may include: a protruding portion formed at the crossing portion where the first and second corrugated portions cross; a pair of inclined surfaces formed at lateral sides of the protruding portion in an extending direction of the first corrugated portion; and first and second folded surfaces respectively formed at lateral sides of the pair of inclined surfaces by the crossing of the first and second corrugated portions. The coupling portion may be formed by a pair of wing portions that are fixedly inserted in triangular insertion grooves, which are formed at the lateral sides of the protruding portion by the first and second folded surfaces that are symmetrical to each other based on an extending direction of the first corrugated portion.

The pair of wing portions may be upwardly slanted and they are symmetrical to each other based on the extending direction of the first corrugated portion.

The fixing device may further include a second fastening member for fixing the reinforcing member to the inner sides of the corrugated portions that are opened to the outside from an end portion of the first barrier.

The second fastening member may be a U-shaped elastic clip for gripping one end portion of the reinforcing member and one end portion of the impact-absorbing plate that is adjacent thereto together.

An adhesive may be interposed between the reinforcing member and the impact-absorbing plate such that the reinforcing member is fixed to the inner sides of the corrugated portions that are opened to the outside from the end portion of the first barrier.

One end portion of the impact-absorbing plate may be inwardly bent toward one end portion of the reinforcing member, which is a tubal member, such that the reinforcing member is fixed to the inner sides of the corrugated portions that are opened from the end portion of the first barrier to the outside.

Advantageous Effects

Using the fixing device of the first barrier-reinforcing member according to the exemplary embodiment of the present invention, the reinforcing member can be simply fixed to the corrugated portions of the first barriers.

MODE FOR INVENTION

Figure 1:
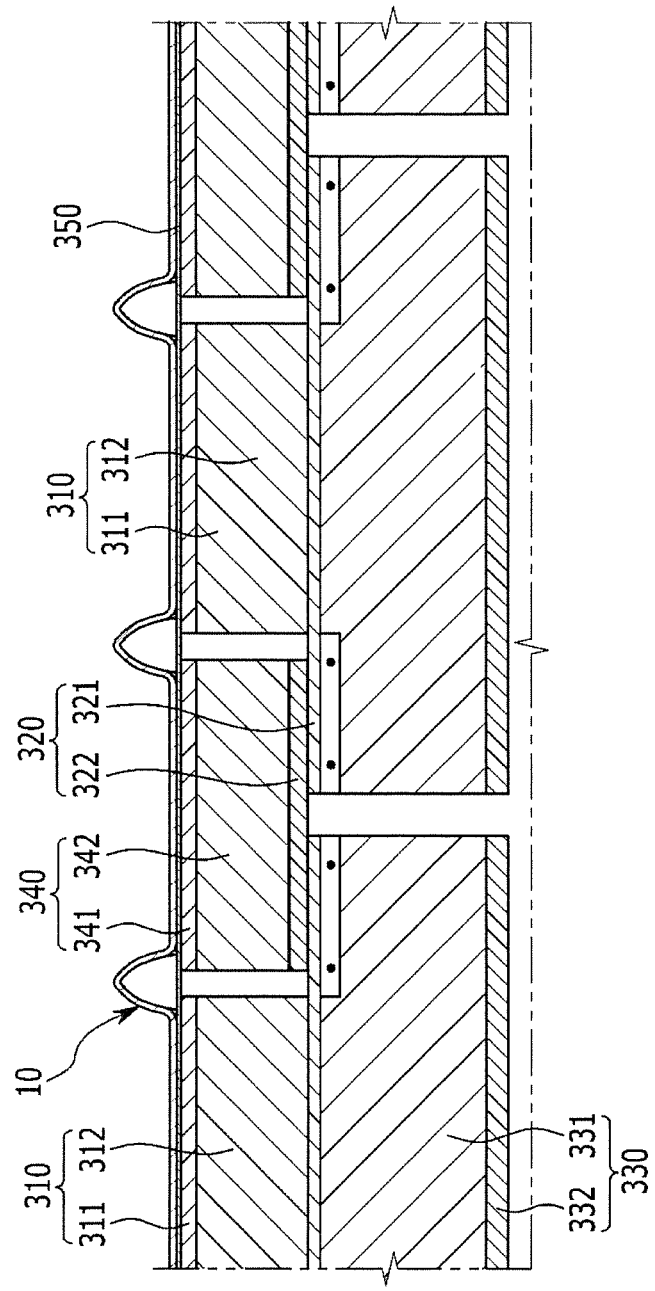
FIG. 1 is a partial cross-sectional view of a liquefied natural gas (LNG) storage tank.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Prior to describing a fixing device of a first barrier-reinforcing member of a liquefied natural gas (LNG) storage tank according to an exemplary embodiment of the present invention, a structure of a first barrier where a fixing device of a reinforcing member according to the exemplary embodiment of the present invention is installed and a cross-sectional configuration of a LNG storage tank will be described.

FIG. 1 is a partial cross-sectional view of an LNG storage tank.

Referring to FIG. 1, an LNG storage tank consists of a first barrier 10, and a heat-insulating board 300 positioned thereunder.

A configuration of the first barrier 10 will be described later in detail.

The heat-insulating board 300 includes an upper heat-insulating board 310, a second barrier 320 that is positioned at a rear side of the upper heat-insulating board 310 to prevent leakage of the LNG, and a lower heat-insulating board 330 that is positioned at a rear side of the second barrier 320.

The upper heat-insulating board 310 includes an upper heat-insulating member-protecting plate 311, and an upper heat-insulating member 312 attached to a rear side of the upper heat-insulating member-protecting plate 311.

The upper heat-insulating member-protecting plate 311 may be formed of wood such as plywood and the like.

The upper heat-insulating member 312 may be formed of a heat-insulating material having a heat-insulating property, for example, polyurethane foam.

The second barrier 320 includes primary second barriers 321 between the upper heat-insulating board 310 and the lower heat-insulating board 330, and an auxiliary second barrier 322 for covering adjacent end portions of the adjacent primary second barriers 321.

A coupling board 340 is positioned on the auxiliary second barrier 322 between the adjacent upper heat-insulating boards 310 to interconnect the adjacent upper heat-insulating boards 310.

The coupling board 340 includes a coupling member-protecting plate 341, and a coupling member 342 attached to a rear side of the coupling member-protecting plate 341.

The coupling member-protecting plate 341 may be formed of wood such as plywood and the like.

The coupling member 342 may be formed of a heat-insulating material having a heat-insulating property, for example, polyurethane foam.

In addition, the lower heat-insulating board 330 includes a lower heat-insulating member 331, and a lower heat-insulating member-protecting plate 332 attached to a rear side of the lower heat-insulating member 331.

The lower heat-insulating member 331 may be formed of a heat-insulating material having a heat-insulating property, for example, polyurethane foam.

An impact-absorbing plate 350 is positioned between the first barrier 10 and the heat-insulating board 300.

The impact-absorbing plate 350 is formed of glass fiber or aluminum, and may absorb impacts that are generated between the first barrier 10 and the heat-insulating board 300.

Figure 2:
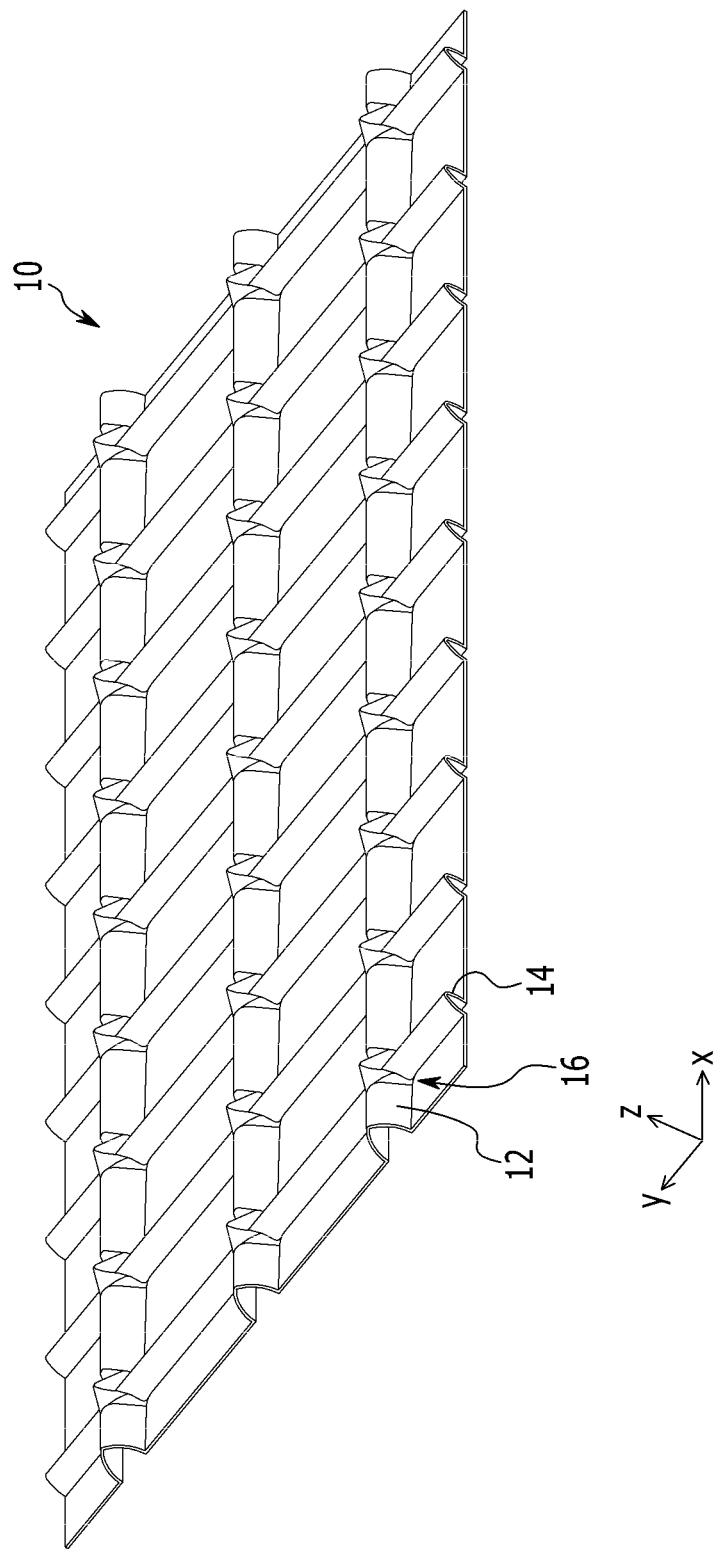
FIG. 2 is a perspective view of a first barrier of the LNG storage tank.

FIG. 2 is a perspective view of the first barrier of the LNG storage tank.

Figure 3:
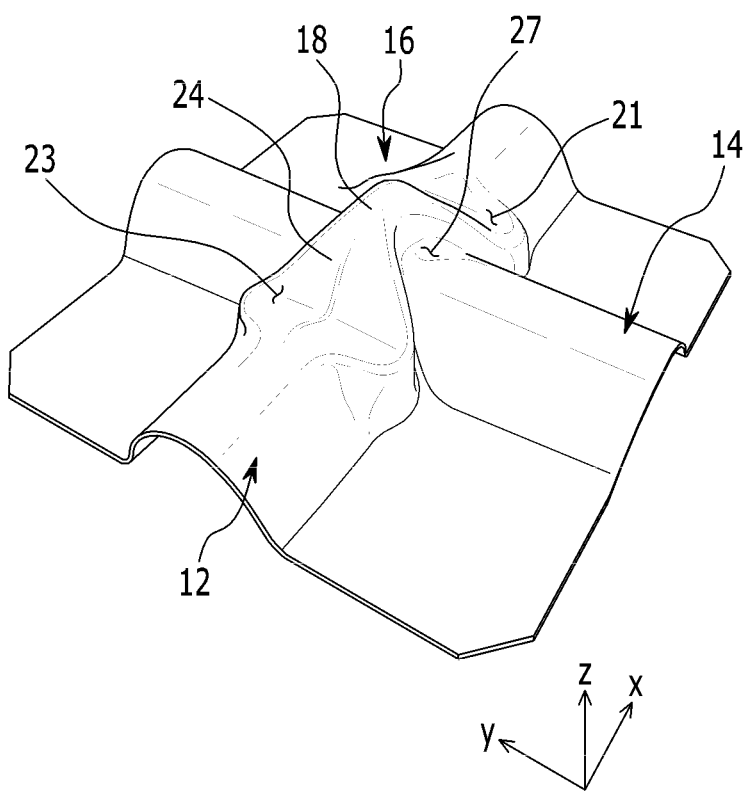
FIG. 3 is a perspective view of corrugated portions and an intersection of the first barrier of the LNG storage tank.

FIG. 3 is a perspective view of corrugated portions and an intersection of the first barrier of the LNG storage tank.

Figure 4:
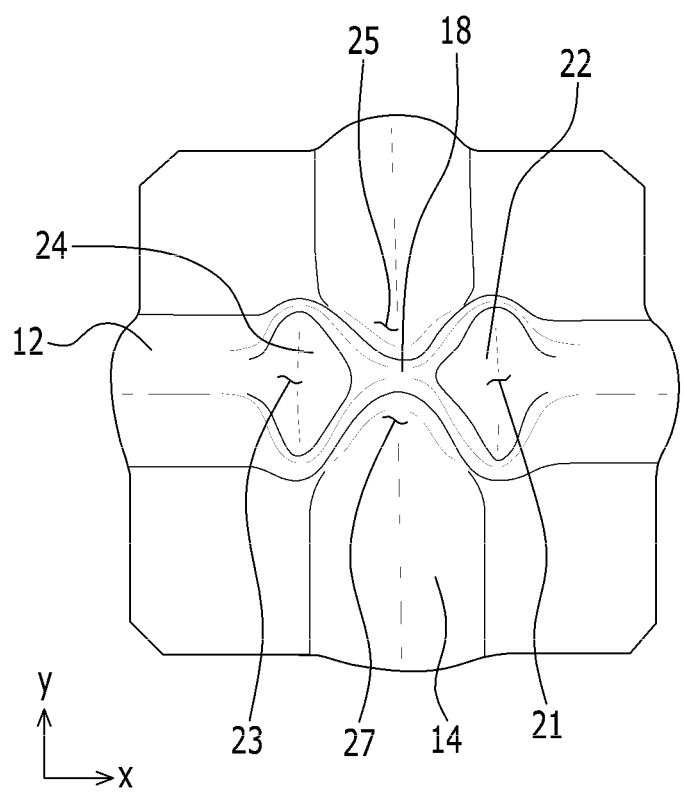
FIG. 4 is a top plan view of the corrugated portions and the intersection of the first barrier of the LNG storage tank.

FIG. 4 is a top plan view of the corrugated portions and the intersection of the first barrier of the LNG storage tank.

Figure 5:
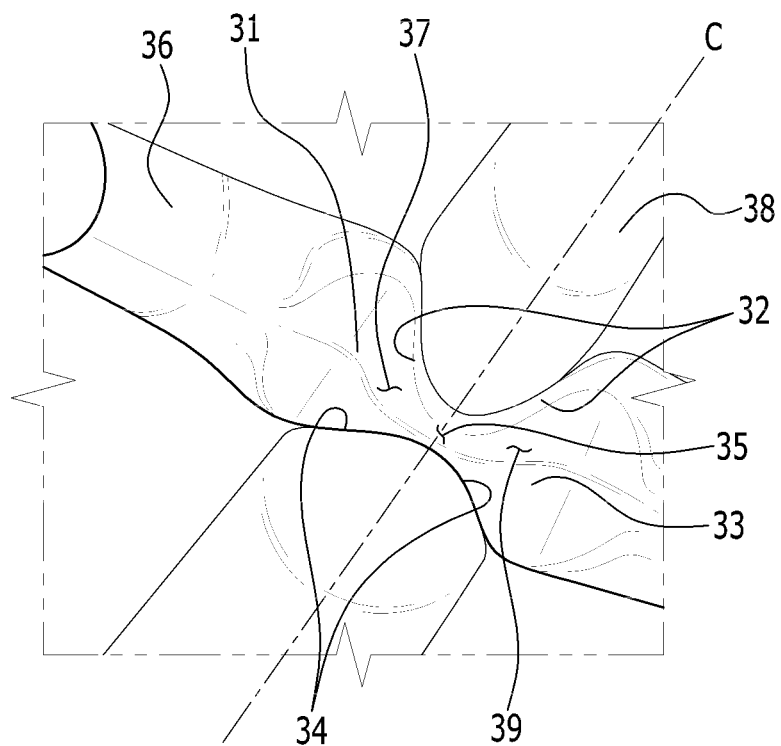
FIG. 5 is a perspective view of the corrugated portions and the intersection of the first barrier of the LNG storage tank viewed from below.

FIG. 5 is a perspective view of the corrugated portions and the intersection of the first barrier of the LNG storage tank viewed from below.

Referring to FIG. 2, the first barrier 10 of the LNG includes, when viewed from FIG. 1, includes a first corrugated portion 12 that extends in an x-axis direction and protrudes in a z-axis direction, and a second corrugated portion 14 that extends in a y-axis direction and protrudes in the z-axis direction.

The first corrugated portion 12 and the second corrugated portion 14 are substantially formed in a lattice shape such that a plurality of corrugated portions are respectively spaced apart from and in parallel with each other in the x-axis and y-axis directions.

A crossing portion 16 is formed at every intersection where the first corrugated portion 12 and the second corrugated portion 14 cross each other.

Referring to FIGS. 2 to 4, the crossing portion 16 is formed with a protruding portion 18 that protrudes in the z-axis direction at the intersection where the first corrugated portion 12 and the second corrugated portion 14 cross, and lateral sides of the protruding portion 18 are formed with first and second grooves 21 and 23 in an extending direction of the first corrugated portion 12, which are formed along an extending direction of the second corrugated portion 14.

As the protruding portion 18 protrudes in the z-axis direction, a groove 35 (refer to FIG. 5) is formed along the extending direction of the first corrugated portion 12 under the protruding portion 18.

A first lateral surface 22 is formed to have a triangular shape at an external surface of the first barrier between the protruding portion 18 and the first groove 21, and a second lateral side 24 is formed to have a triangular shape at the external surface of the first barrier between the protruding portion 18 and the second groove 23.

Concave portions 25 and 27 are formed at the lateral sides of the protruding portion 18 in the extending direction of the second corrugated portion 14.

Referring to FIGS. 2 to 5, since the first barrier 10 is formed of a plate and the first and second corrugated portions 12 and 14 of the first barrier 10 have curved cross-sections, a hollow space is formed under the first corrugated portion 12, the second corrugated portion 14, and the crossing portion 16.

In this case, a rear surface 36 of the first corrugated portion 12 and a rear surface 38 of the second corrugated portion 14 are curvedly formed.

Referring to FIG. 5, under the crossing portion 16, a pair of inclined surfaces 31 and 33 having an overall triangular shape are formed at the lateral sides of the protruding portion 18 thereunder, and the inclined surfaces 31 and 33 are respectively symmetrically formed based on a center line C in the extending direction of the second corrugated portion 14.

In this case, the first and second corrugated portions 12 and 14 cross such that first and second folded surfaces 32 and 34 are respectively formed at the lateral sides of the inclined surfaces 31 and 33.

The first and second folded surfaces 32 and 34 are symmetrical to each other based on the extending direction of the first corrugated portion.

As shown in FIG. 5, since the first and second folded surfaces 32 and 34 are symmetrical to each other, insertion grooves 37 and 39 are formed to have an overall triangular shape at the lateral sides of the protruding portion 18 thereunder.

A fixing device of a reinforcing member to be described later can be inserted in the insertion grooves 37 and 39.

In this case, the protruding portion 18, the first and second grooves 21 and 23, the concave portions 25 and 27, and the first and second folded surfaces 32 and 34 that are formed at the crossing portion 16 of the first barrier 10 may be formed such that their respective corners are curvedly formed using a drawing, a mold, or an extrusion manufacturing method.

Figure 6:
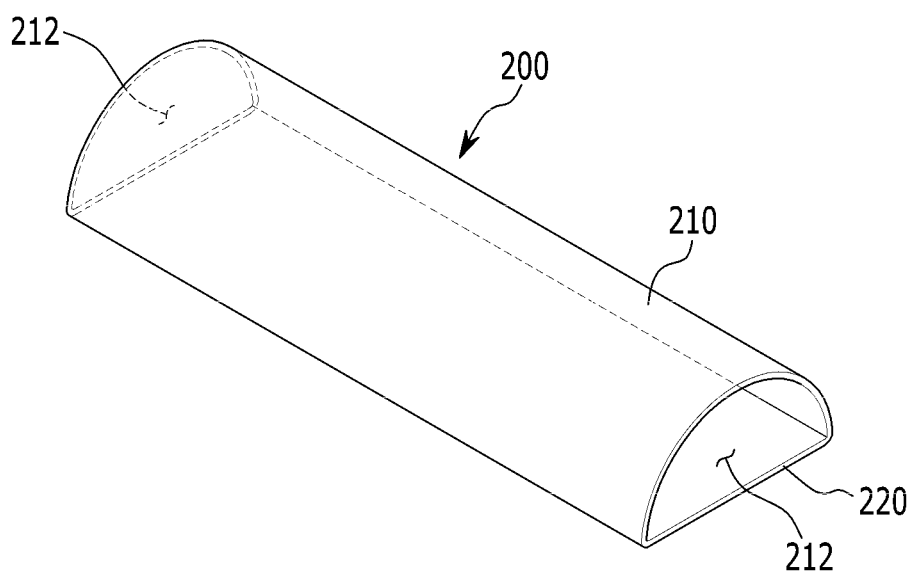
FIG. 6 is a perspective view of one example of a reinforcing member installed at the first barrier.

FIG. 6 is a perspective view of one example of a reinforcing member installed at the first barrier.

Referring to FIG. 6, the reinforcing member 200 fixable to the corrugated portions of the first barrier using the fixing device according to the exemplary embodiment of the present invention includes a supporting portion 210 and a bottom portion 220.

The supporting portion 210 of the reinforcing member 200 is curved to have a shape that corresponds to bottom surfaces of the first and second corrugated portions 12 and 14, and is formed of a plate-shaped member that extends in one direction.

The bottom portion 220 is formed under the supporting portion 210.

The bottom portion 220 is formed to have a rectangular plate shape that extends in one direction.

In this case, the reinforcing member 200 may be formed as a tube that consists of the supporting portion 210 and the bottom portion 220.

Opposite end portions 212 of the supporting portion 210 and the bottom portion 220 in the extending direction thereof may be formed to be open in opposite lateral directions.

The fixing device according to the exemplary embodiment of the present invention is a device for fixing the reinforcing members 200 under the corrugated portions of the first barrier 10.

A configuration of a fixing device of a first barrier-reinforcing member will now be described in detail with reference to different drawings.

Figure 7:
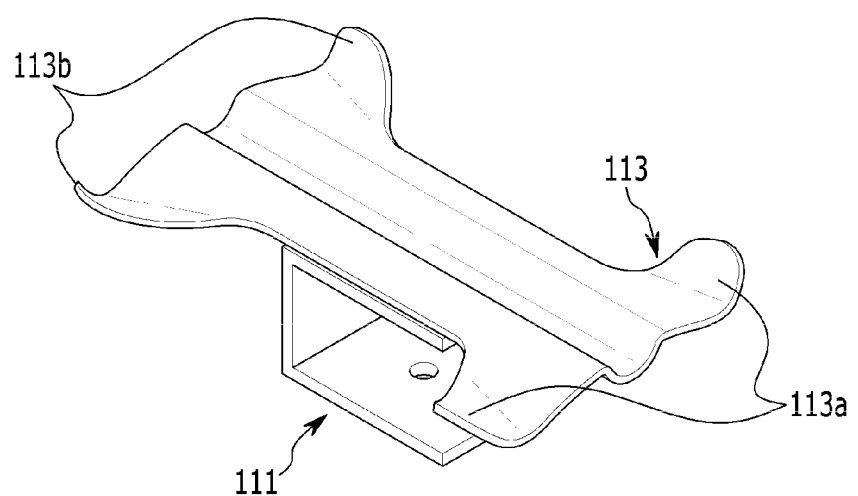
FIG. 7 is a perspective view of a fixing device of a first barrier-reinforcing member according to the exemplary embodiment of the present invention.

FIG. 7 is a perspective view of the fixing device of the first barrier-reinforcing member according to the exemplary embodiment of the present invention.

Figure 8:
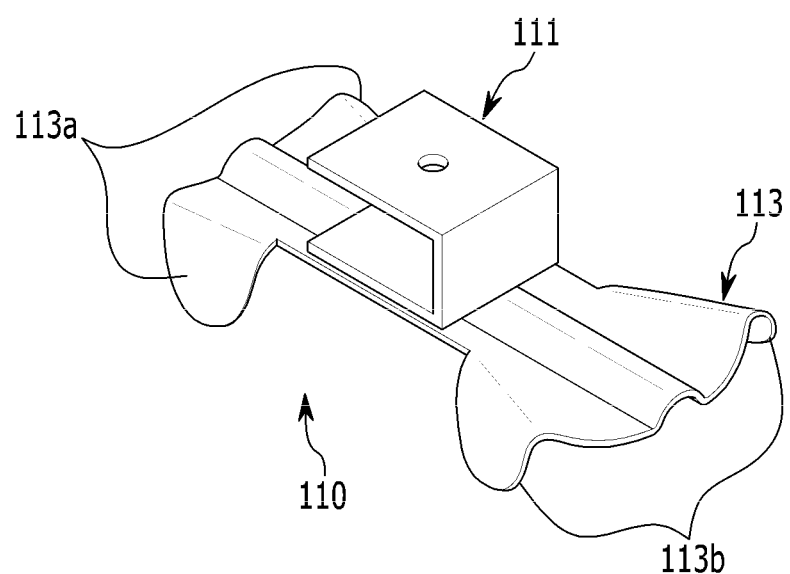
FIG. 8 is a perspective view of the fixing device of the first barrier-reinforcing member according to the exemplary embodiment of the present invention viewed from below.

FIG. 8 is a perspective view of the fixing device of the first barrier-reinforcing member according to the exemplary embodiment of the present invention viewed from below.

Figure 9:
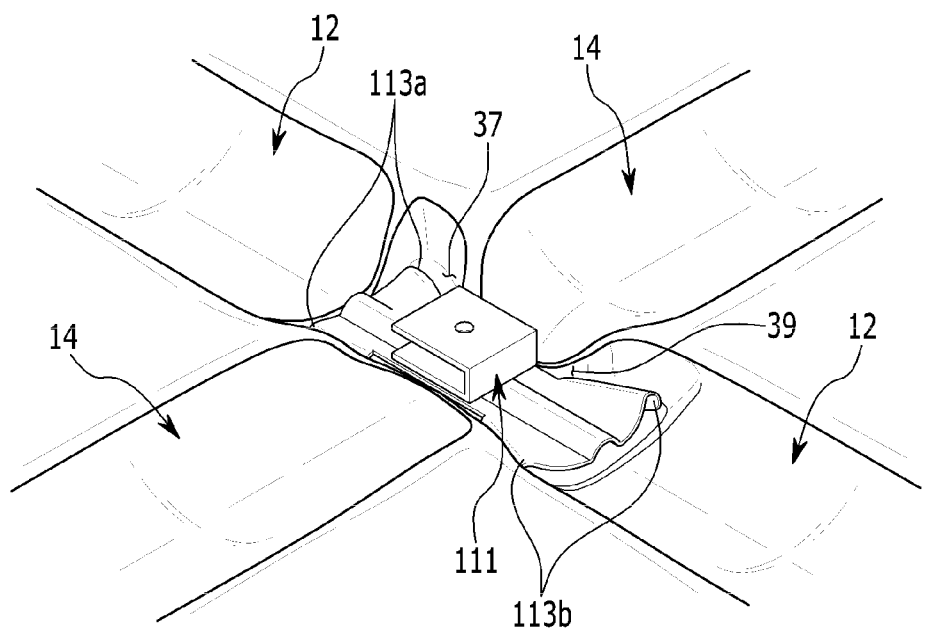
FIG. 9 is a partial perspective view of the fixing device of the first barrier-reinforcing member according to the exemplary embodiment of the present invention fixed to a bottom of the intersection of the first barrier.

FIG. 9 is a partial perspective view of the fixing device of the first barrier-reinforcing member according to the exemplary embodiment of the present invention fixed to a bottom of the intersection of the first barrier.

Figure 10:
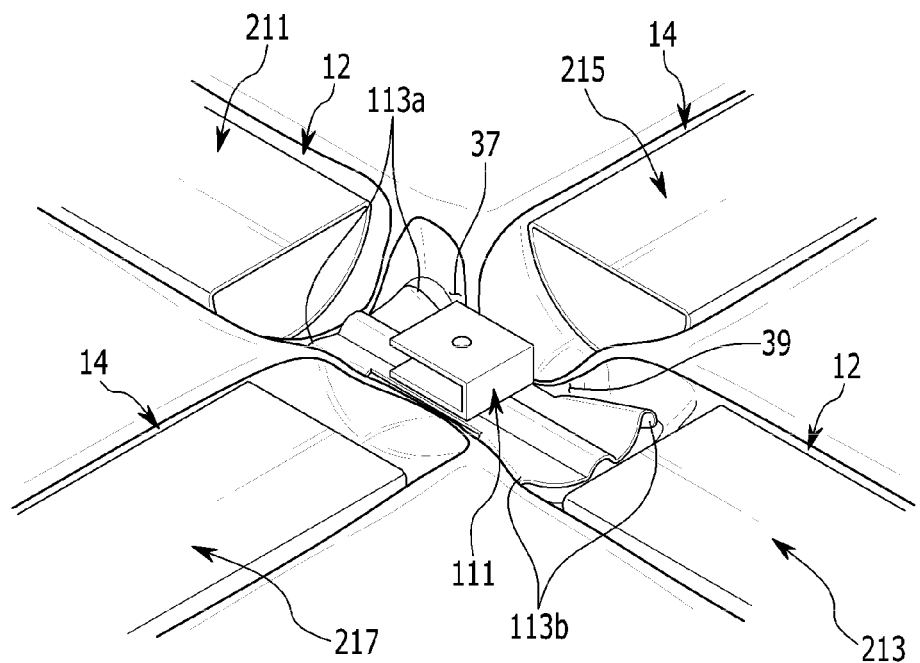
FIG. 10 is a perspective view of first and second reinforcing members fixed by the first barrier-reinforcing member according to the exemplary embodiment of the present invention.

FIG. 10 is a perspective view of first and second reinforcing members fixed by the first barrier-reinforcing member according to the exemplary embodiment of the present invention.

Figure 12:
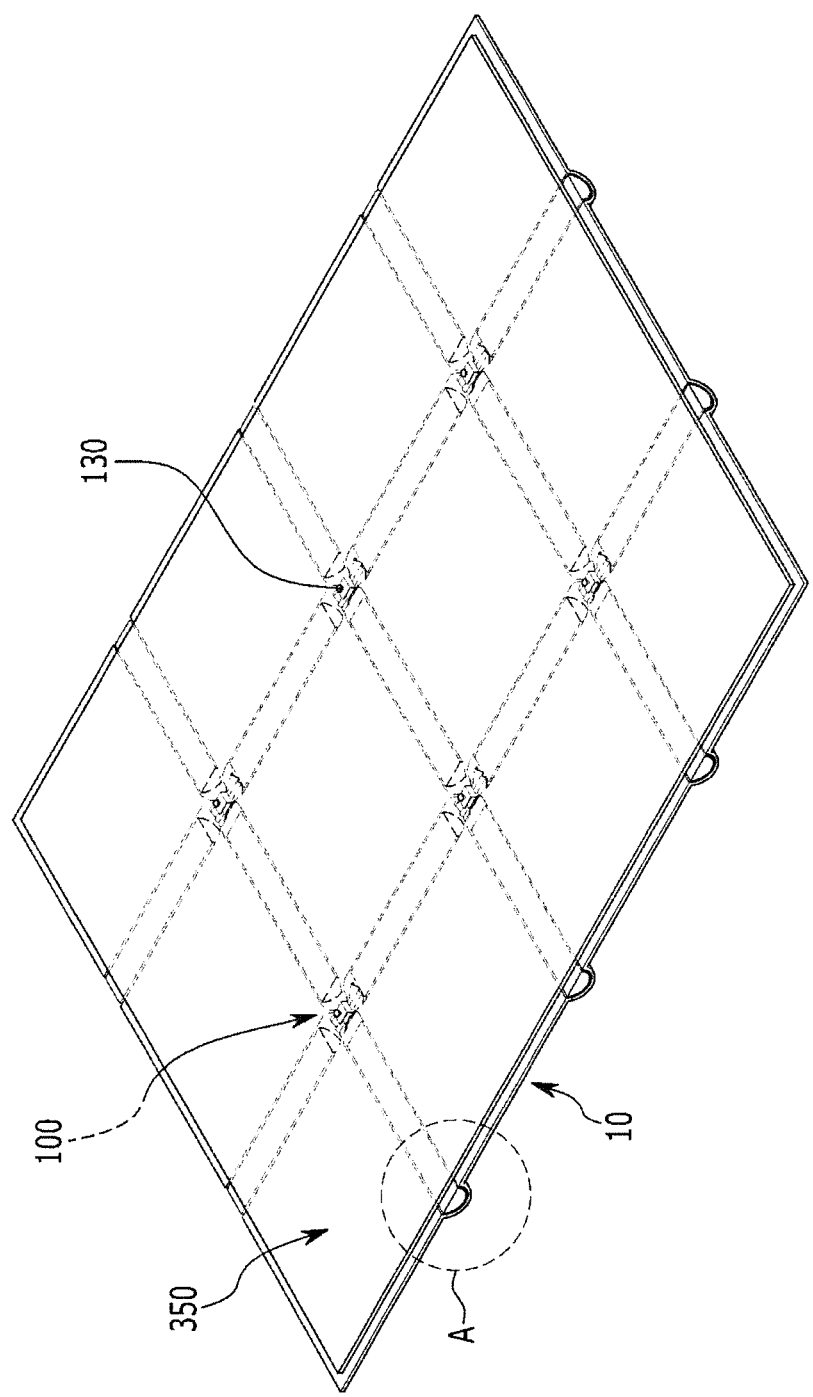
FIG. 12 is a perspective view of impact-absorbing plates fixed to the bottom of the first barrier.
Figure 13:
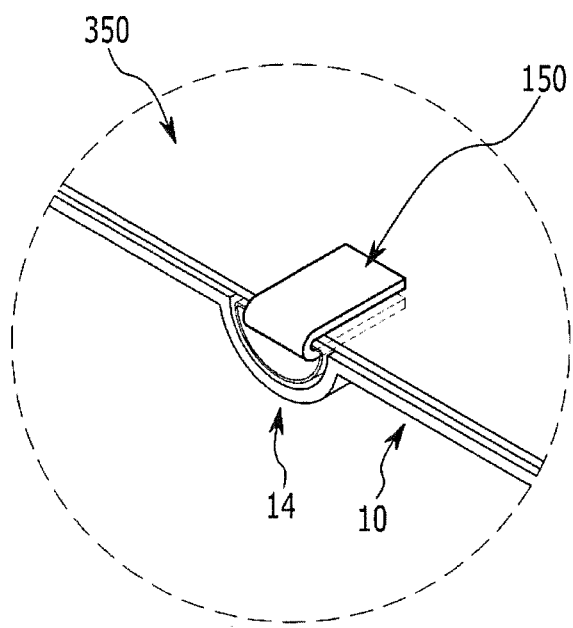
FIG. 13 is a partial perspective view of a portion in which a second fastening member according to the exemplary embodiment of the present invention is installed.

Referring to FIGS. 7 to 10, the fixing device 100 of the first barrier-reinforcing member according to the exemplary embodiment of the present invention includes a fixing bracket 110, a first fastening member 130 (refer to FIG. 12), and a second fastening member 150 (refer to FIG. 13).

According to the exemplary embodiment of the present invention, the fixing bracket 110 includes a body 111 and a coupling portion 113, and may be fixedly inserted in the insertion grooves 37 and 39 (refer to FIG. 5).

In this case, as described above, the insertion grooves 37 and 39 refer to portions under the protruding portion 18 of the first barrier, which are concavely formed under the crossing portion 16 as the plate-shaped protruding portion 18 of the first barrier upwardly protrudes.

The fixing bracket 110 of the fixing device 100 is fixedly inserted in the concavely formed insertion grooves 37 and 39 such that the fixing device 100 can be fixed under the crossing portion 16 of the first barrier.

According to the exemplary embodiment of the present invention, the coupling portion 113 of the fixing bracket 110 is fixedly inserted in the insertion grooves 37 and 39 that are formed to have an overall triangular shape under the first barrier 10.

Referring to FIG. 7, the coupling portion 113 may include a pair of wing portions 113a and 113b that can be fixedly inserted in the insertion grooves 37 and 39.

The wing portions 113a and 113b may be formed to have a pair of wing shapes that are upwardly slanted and are symmetrical to each other based on the extending direction of the first corrugated portion 12 of the first barrier 10.

In this case, the wing portions 113a and 113b may be formed of a material having an elastic property.

Accordingly, the wing portions 113a and 113b are elastically fixedly inserted in the insertion grooves 37 and 39, respectively.

However, the coupling portion 113 to be fixedly inserted in the insertion grooves 37 and 39 is not limited to have the wing shapes, and may have various shapes that can be fixedly inserted in the triangular insertion grooves 37 and 39.

Referring to FIGS. 9 and 10, the wing portions 113a and 113b respectively have a pair of wing shapes to elastically support the lateral sides of the triangular insertion grooves 37 and 39 at the same time.

Thus, the wing portions 113a and 113b of the coupling portion 113 can be fixed to the insertion grooves 37 and 39.

In the exemplary embodiment of the present invention, the coupling portion 113 is formed such that it has the pair of wing shapes and is fixedly inserted in the triangular insertion grooves, but the coupling portion 113 may be formed such that it has various shapes to be fixedly inserted under the crossing portion 16 of the first barrier.

Referring to FIGS. 7 and 8, the body 111 of the fixing bracket 110 is combined to the coupling portion 113 such that it is fastened to a first fastening member 130 to be described later.

In this case, the body 111 can be combined to the pair of wing portions 113a and 113b at a center thereof.

According to the exemplary embodiment of the present invention, a member having a plate shape can be bent in a U-shape to form the body 111.

However, the shape of the body 111 is not limited thereto, and may be formed to have various shapes such as a hexahedron and the like that can be fastened to the impact-absorbing plate.

Referring to FIG. 7, one of two portions of the body 111 bent in a U-shape parallel to and facing each other may be combined with the coupling portion 113, while the other can be combined with the first fastening member 130 to be described later.

In this case, the body 111 and the coupling portion 113 may be fixed to each other by a rivet or a bolt and a nut.

According to the exemplary embodiment of the present invention, the body 111 and the coupling portion 113 may be formed of a metallic plate.

For example, the metallic plate may be a plate formed of aluminum or stainless steel.

As another exemplary embodiment of the present invention, the coupling portion and the body of the fixing bracket that are fixed under the crossing portion 16 of the first barrier may be integrally formed of a foamable material (not shown).

Unlike the exemplary embodiment in which the body and the coupling portion having different configurations are coupled to each other, the coupling portion and the body may be integrally formed and have according shapes to be coupled to each other such that they are fixedly inserted in the insertion grooves 37 and 39 under the crossing portion 16.

In this case, the foamable material may be foamable polyethylene.

Processes in which first and second reinforcing members 211, 213, 215, and 217 for respectively supporting inner sides of the first and second corrugated portions 12 and 14 are fixed to the inner sides of the corrugated portions of the first barriers will now be described with reference to FIGS. 9 to 12.

Referring to FIGS. 9 and 10, the aforementioned fixing bracket 110 is fixedly inserted under the crossing portion 16 of the first barrier 10, and the first and second reinforcing members 211, 213, 215, and 217 are disposed at the inner sides of the first and second corrugated portions 12 and 14.

In this case, the first and second reinforcing members 211, 213, 215, and 217 are not combined with the fixing bracket 110, and are disposed at the inner sides of the first and second corrugated portions 12 and 14.

Figure 11:
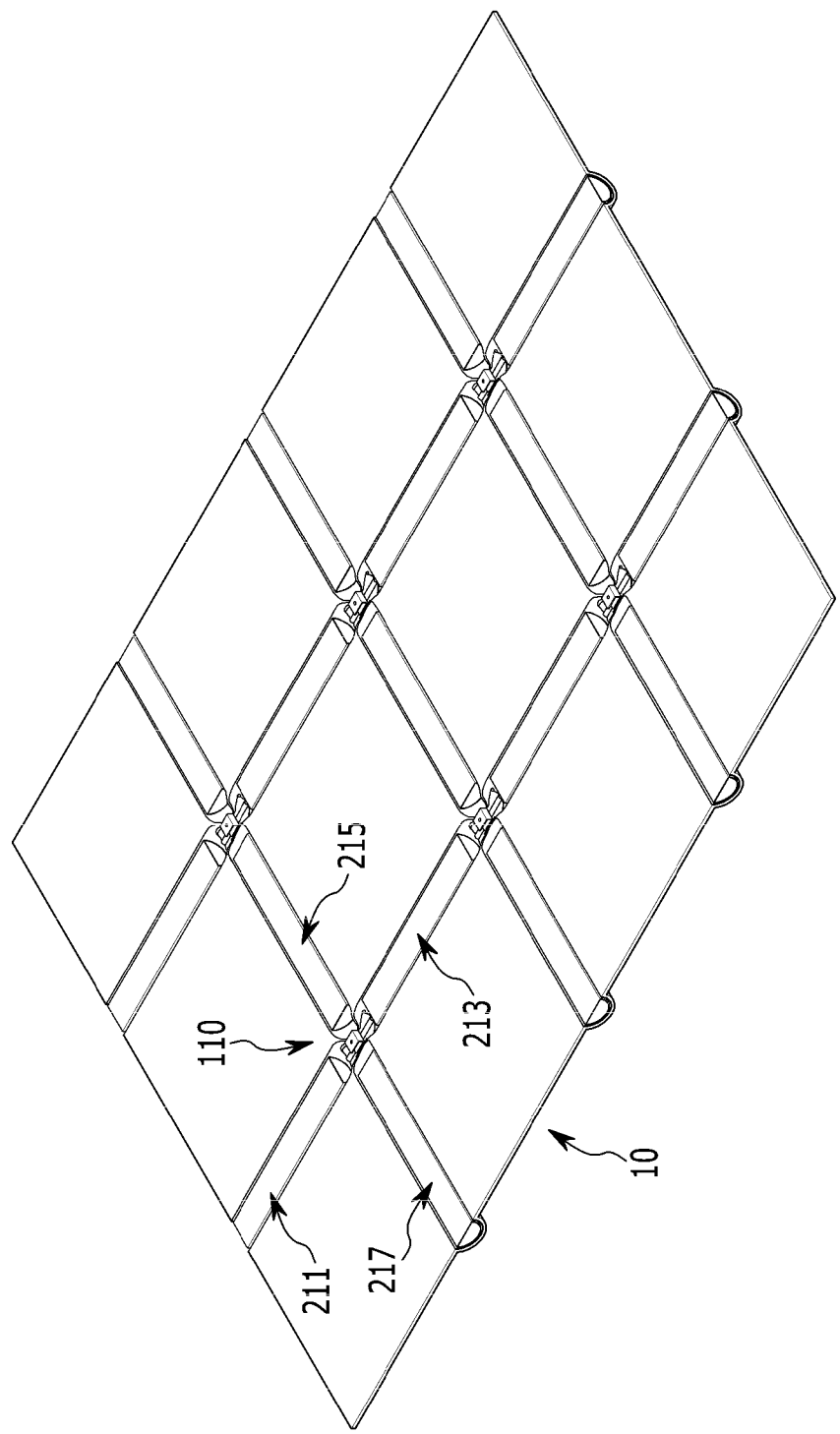
FIG. 11 is a perspective view of the first barrier to which the fixing device and the reinforcing members according to the exemplary embodiment of the present invention are fixed.

Then, as shown in FIGS. 11 and 12, a bottom surface of the first barrier where the first and second reinforcing members 12 and 14 are positioned is covered with the impact-absorbing plate 350.

Then, after covering the rear surface of the first barrier with the impact-absorbing plate 350, the fixing bracket 110 and the impact-absorbing plate 350 are fastened to each other using the first fastening member 130.

In this case, the first fastening member 130 is provided to fasten the impact-absorbing plate 350 and the body 111 of the fixing bracket 110 with respect to each other, and the first fastening member 130 may be, for example, a rivet or a bolt and a nut that can be screw-coupled to each other.

Meanwhile, referring to FIG. 13, the fixing device 100 according to the exemplary embodiment of the present invention may further include the second fastening member 150 to fasten the reinforcing member that is positioned at an end portion of the first barrier 10.

During a manufacturing process of the LNG storage tank, when the bottom surface of the first barrier is covered with the impact-absorbing plate and is then vertically erected, the reinforcing members positioned at the end portions of the first barrier may be directed out therefrom.

In this case, the second fastening member 150 fastens the reinforcing member and the impact-absorbing plate with respect to each other such that the reinforcing member of an "A" region of FIG. 12 at the end portion of the first barrier 10 does not move out of the outwardly opened corrugated portion.

According to the exemplary embodiment of the present invention, the second fastening member 150 may be a U-shaped elastic clip.

As shown in FIG. 13, the elastic clip grips one end portion of the reinforcing member and one end portion of the impact-absorbing plate that is adjacent to one end portion of the reinforcing member, thereby fastening them with respect to each other.

However, the second fastening member for fastening the reinforcing member and the impact-absorbing plate with respect to each other is not limited thereto, and may be fixed by fastening one end portion of the impact-absorbing plate corresponding to one end portion of the reinforcing member with a rivet or a bolt and a nut.

Figure 15:
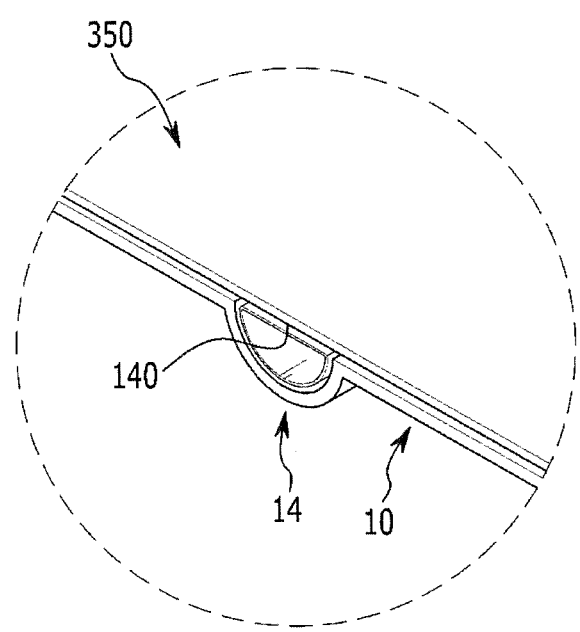
FIG. 15 is a partial perspective view of a reinforcing member fixed to an end portion of the first barrier in accordance with another exemplary embodiment of the present invention.

According to another exemplary embodiment of the present invention, as shown in FIG. 15, in order to fasten the reinforcing member and the impact-absorbing plate with respect to each other, an adhesive 140 may be interposed therebetween.

That is, the adhesive 140 is interposed between the bottom portion 220 of the reinforcing member and the impact-absorbing plate 350 to fix the reinforcing member and the impact-absorbing plate with respect to each other.

Figure 14:
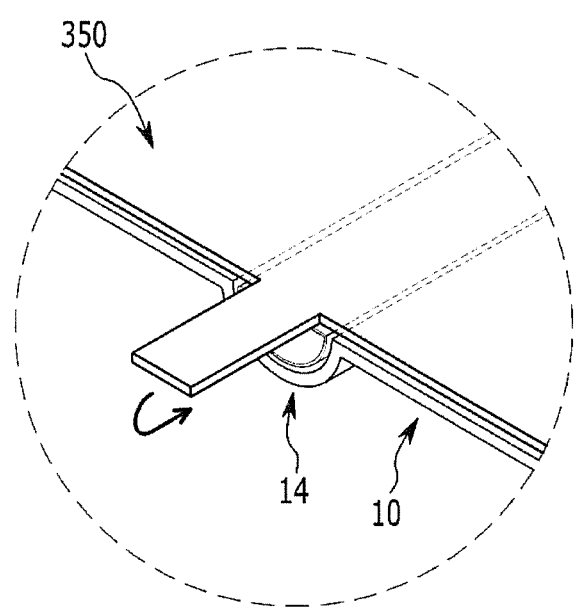
FIG. 14 is a partial perspective view of a reinforcing member fixed to an end portion of the first barrier in accordance with another exemplary embodiment of the present invention.

In addition, according to a further exemplary embodiment of the present invention, as shown in FIG. 14, the end portion of the impact-absorbing plate 350 may be partially inwardly bent toward the end portion of the reinforcing member, which is a tubular member, to fix the reinforcing member and the impact-absorbing plate with respect to each other.

As described above, the fixing device 100 of the first barrier-reinforcing member according to the exemplary embodiment of the present invention can fixedly install the reinforcing member at the first barrier 10 without using an additional fixing means, thereby having an advantage of simplifying a time and a process for installing the first barrier 10.

Further, the fixing device 100 of the first barrier-reinforcing member of the LNG storage tank according to the exemplary embodiment of the present invention can be applicable not only to an LNG storage tank installed in a self-propelled LNG carrier or an LNG regasification vessel (RV), but also to an LNG storage tank installed in a floating structure such as an LNG FPSO (Floating, Production, Storage, and Offloading) or an LNG FSRU (Floating Storage Regasification Unit).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

Using the fixing device of the first barrier-reinforcing member according to the exemplary embodiment of the present invention, the reinforcing member can be simply fixed to the corrugated portions of the first barriers.

The invention claimed is:

1. A fixing device in a liquefied natural gas (LNG) storage tank including a heat-insulating board forming an inner wall, comprising:
    a first barrier including first and second corrugated portions crossing each other, and positioned on the heat-insulating board;
    an impact-absorbing plate between the heat-insulating board and the first barrier;
    a first barrier-reinforcing member for supporting the first and second corrugated portions;
    a fixing bracket including a coupling portion fixedly inserted in insertion grooves formed under lateral sides of a crossing portion where the first and second corrugated portions cross, and a body coupled to one side of the coupling portion; and
    a first fastening member for fastening the impact-absorbing plate between the heat-insulating board and the first barrier with one side of the body, wherein the first barrier-reinforcing member is fixed to inner sides of the first and second corrugated portions by the impact-absorbing plate,
    wherein the first barrier includes:
        a protruding portion formed at the crossing portion where the first and second corrugated portions cross;
        a pair of inclined surfaces formed at lateral sides of the protruding portion in an extending direction of the first corrugated portion; and
        first and second folded surfaces respectively formed at lateral sides of the pair of inclined surfaces by the crossing of the first and second corrugated portions,
    wherein the coupling portion is formed of a metallic plate and includes a pair of wing portions that is fixedly inserted in the insertion grooves, which are formed at the lateral sides of the protruding portion by the first and second folded surfaces that are symmetrical to each other based on an extending direction of the first corrugated portion, each of the insertion grooves has a triangular shape, and
    wherein the pair of wing portions have an elastic property, and respectively have a pair of wing shapes to elastically support lateral sides of the insertion grooves at the same time.

2. The fixing device of claim 1, wherein the pair of wing portions are upwardly slanted and they are symmetrical to each other based on the extending direction of the first corrugated portion.

3. The fixing device of claim 1, further comprising a second fastening member for fixing the first-barrier-reinforcing member to the inner sides of the first and second corrugated portions that are opened to the outside from an end portion of the first barrier.

4. The fixing device of claim 3, wherein the second fastening member is a U-shaped elastic clip for gripping one end portion of the first barrier-reinforcing member and one end portion of the impact-absorbing plate that is adjacent thereto together.

5. The fixing device of claim 1, wherein an adhesive is interposed between the first barrier-reinforcing member and the impact-absorbing plate such that the first barrier-reinforcing member is fixed to the inner sides of the first and second corrugated portions that are opened to the outside from an end portion of the first barrier.

6. The fixing device of claim 1, wherein one end portion of the impact-absorbing plate is inwardly bent toward one end portion of the first barrier-reinforcing member, which is a tubular member, such that the first barrier-reinforcing member is fixed to the inner sides of the corrugated portions that are opened from the end portion of the first barrier to the outside.

* * * * *